US009554506B2

(12) United States Patent
Bittner et al.

(10) Patent No.: US 9,554,506 B2
(45) Date of Patent: Jan. 31, 2017

(54) FLUID FLOW MONITORING AND CONTROL SYSTEM FOR AN AGRICULTURAL SPRAYER

(71) Applicant: CNH Industrial America LLC, New Holland, PA (US)

(72) Inventors: Roy A. Bittner, Cato, WI (US); Nathan Paul Brooks, Manitowoc, WI (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/697,216

(22) Filed: Apr. 27, 2015

(65) Prior Publication Data
US 2016/0309647 A1 Oct. 27, 2016

(51) Int. Cl.
G06F 7/70 (2006.01)
A01C 23/04 (2006.01)
A01G 25/00 (2006.01)
A01M 7/00 (2006.01)

(52) U.S. Cl.
CPC ............ *A01C 23/047* (2013.01); *A01G 25/00* (2013.01); *A01M 7/0089* (2013.01)

(58) Field of Classification Search
CPC ..... A01C 23/047; A01C 23/008; A01G 25/00; A01M 7/0089; A01M 7/0042; E02F 9/2022; E02F 9/26; A01B 79/005; B60G 17/04; B62D 49/06
USPC ..... 701/50; 239/1, 10, 62, 69, 159; 137/588, 137/15.01
See application file for complete search history.

(56) References Cited

U.S. PATENT DOCUMENTS

| 5,260,875 | A | 11/1993 | Tofte et al. | |
|---|---|---|---|---|
| 5,475,614 | A | 12/1995 | Tofte et al. | |
| 5,651,500 | A | 7/1997 | Patterson et al. | |
| 5,919,242 | A * | 7/1999 | Greatline | A01C 15/00 701/50 |
| 6,009,354 | A | 12/1999 | Flamme et al. | |
| 6,711,949 | B1 * | 3/2004 | Sorenson | G01F 23/38 340/623 |
| 7,435,581 | B2 | 10/2008 | West | |
| 7,502,665 | B2 | 3/2009 | Giles et al. | |

(Continued)

OTHER PUBLICATIONS

Oksanen, Suomi, Visala, Haapala; ISOBUS Compatible Implements in the Project AGRIX; Precision Agriculture '05, 5$^{th}$ European Conference on Precision Agriculture, Uppsala, Sweden; pp. 564-572.
FARMSCAN, AG; 24V1 Spray Controller: Operation's Manual; Jul. 2010; Part No. AM-24V1-1.0; Ver 1.0 Rev III.

*Primary Examiner* — Shardul Patel
(74) *Attorney, Agent, or Firm* — Rebecca L. Henkel; Rickard K. DeMille (57) ABSTRACT

A fluid flow monitoring and control system for a self-propelled applicator which may be a sprayer and is configured to allow real-time visual monitoring of graphical representations of system statuses, control of the systems, and coordinated control instructions for multiple tasks through a single user input or command. The fluid flow monitoring and control system may include a touchscreen HMI providing electronic control and monitoring for the systems and components of the applicator. A rules engine may be implemented to prevent erroneous states, such as activating a pump without fluid flow to the pump as a rule implemented interlock to prevent inadvertent rapid component wear or other compromises of system integrity.

20 Claims, 5 Drawing Sheets

(56) References Cited

U.S. PATENT DOCUMENTS

| | | | |
|---|---|---|---|
| 7,613,227 B2* | 11/2009 | Rouphael | H04B 1/707 375/142 |
| 7,706,926 B2 | 4/2010 | Peterson | |
| 8,028,927 B2* | 10/2011 | Ward | A01M 7/0089 239/1 |
| 8,488,874 B2 | 7/2013 | Zaman et al. | |
| 8,868,300 B2 | 10/2014 | Kocer et al. | |
| 8,942,896 B2 | 1/2015 | Mayerle | |
| 2002/0071916 A1* | 6/2002 | Rawlings | B05B 1/3013 427/8 |
| 2005/0090915 A1 | 4/2005 | Geiwitz | |
| 2005/0090916 A1* | 4/2005 | Aghababazadeh | G01R 31/2831 700/90 |
| 2008/0230624 A1* | 9/2008 | Giles | F16K 31/0655 239/69 |
| 2010/0019485 A1* | 1/2010 | Huegerich | F04B 49/065 285/119 |
| 2011/0270494 A1* | 11/2011 | Imhof | A01D 57/20 701/50 |
| 2013/0032363 A1* | 2/2013 | Curry | A01C 7/205 172/4 |
| 2013/0320105 A1* | 12/2013 | Schmidt | A01M 7/0089 239/1 |
| 2014/0116153 A1* | 5/2014 | Stewart | G01F 1/52 73/861 |
| 2014/0252111 A1* | 9/2014 | Michael | B05B 15/025 239/11 |

* cited by examiner

FLUID FLOW MONITORING AND CONTROL SYSTEM FOR AN AGRICULTURAL SPRAYER

FIELD OF THE INVENTION

The invention relates generally to agricultural product application equipment or applicators such as self-propelled and other sprayers and, in particular, to a fluid flow monitoring and control system for a self-propelled applicator or sprayer.

BACKGROUND OF THE INVENTION

Over time, agricultural sprayers and other applicators have gotten larger to increase machine efficiency with wider booms that can cover more area in a single pass. The operational systems of applicators have correspondingly gotten more powerful and complex. Such complex operational systems include product delivery systems that direct stored product to multiple spray sections of the boom and can include rinse and air systems for liquid and pneumatic purging of various lines of the applicator. Attempts to remotely control components of these complex systems is typically done with mechanical switches, requiring long lengths of conductors running from each component to an array of mechanical switches in a cab of the applicator. The array of mechanical switches can be confusing to use especially for new operators, which can at times activate or deactivate components in ways that can compromise the integrity of the components or create other system problems.

SUMMARY OF THE INVENTION

A fluid flow monitoring and control system for a self-propelled applicator such as a sprayer is provided that may allow for touchscreen view and control of various fluid systems including valve activation and deactivation patterns in the sprayer, which may be done without using a field computer of the applicator.

According to one aspect of the invention, a fluid flow monitoring and control system for a self-propelled applicator is configured to allow real-time visual monitoring of graphical representations of system statuses, control of the systems, and coordinated control instructions for multiple tasks through a single user input or command. The fluid flow monitoring and control system may include a touchscreen HMI providing electronic control and monitoring for the systems and components of the sprayer system, including electronically actuated ball valves and/or pumps. A rules engine may be implemented to prevent erroneous states, such as activating a pump without fluid flow to the pump as a rule implemented interlock to prevent inadvertent cavitation of the pump. A product circuit or a rinse circuit can be activated through the touchscreen and fluid flow paths for either the product or rinse circuits can be redefined by opening and closing valves of an on-board valve system and/or a boom valve system.

According to another aspect of the invention, a fluid flow monitoring and control system for a self-propelled agricultural sprayer is provided. The fluid flow monitoring and control system includes a product system, a rinse system and an air purge system. The product system includes a product storage system with a product tank storing an agricultural liquid product on a chassis of the sprayer. A spray boom is supported by the chassis of the sprayer and defines multiple spray sections receiving the liquid product and selectively delivering the liquid product to an agricultural field. An on-board valve system includes a product tank outlet valve configured to actuate between a closed position preventing flow of the liquid product out of the product tank and an open position permitting flow of the liquid product out of the product tank. A boom valve system includes multiple spray section feed valves. Each of the spray section feed valves is configured to actuate between a closed position preventing flow of the liquid product for delivery through a respective spray section and an open position permitting flow of the liquid product through the respective spray section. A control system controls the on-board and boom valve systems. The control system includes an operator interface with a monitor displaying a current state of each of the product tank outlet valve and the spray section feed valves with the current state corresponding to whether the product tank outlet valve and the spray section feed valves are in the closed or open positions at a current time.

According to another aspect of the invention, the monitor includes a touchscreen and the control system may include multiple spray deactivation/activation buttons displayed on the touchscreen. The multiple spray deactivation/activation buttons control the multiple spray section feed valves. Pressing each of the spray deactivation/activation buttons actuates the respective spray section feed valve between the closed and open positions. A product tank close/open button displayed on the touchscreen controls the product tank outlet valve. Pressing the product tank close/open button actuates the product tank outlet valve between the closed and open positions. The multiple spray deactivation/activation buttons may change visually when pressed to provide a visual indication of a changed state corresponding to changing between the closed and open positions of the spray section feed valves. The product tank close/open button may change visually when pressed to provide a visual indication of a changed state corresponding to changing between the closed and open positions of the product tank outlet valve.

According to another aspect of the invention, bidirectional communication may be defined between the control system and each of the spray section feed valves and the product tank outlet valve. Each of the spray section feed valves and the product tank outlet valve may send a response signal to the control system corresponding to current states of the spray section feed valves and the product tank outlet valve.

According to another aspect of the invention, a pump may be arranged between the product tank and the spray boom for delivering liquid, product from the product tank to the spray boom. The control system may include a pump deactivation/activation button displayed on the touchscreen controlling the pump. Pressing the pump deactivation/activation button deactivates and activates the pump.

The rinse system may include a rinse liquid storage system having a rinse tank storing a rinse liquid such as water or another suitable rinse liquid. The on-board valve system may include a rinse tank outlet valve configured to actuate between a closed position preventing flow of the rinse liquid out of the rinse tank and an open position permitting flow of the rinse liquid out of the rinse tank to the pump for delivery toward the spray boom. The control system may further include a rinse tank close/open button displayed on the touchscreen controlling the rinse tank outlet valve. Pressing the rinse tank close/open button actuates the rinse tank outlet valve between the closed and open positions.

According to another aspect of the invention, the control system includes a riles engine configured to prevent at least one erroneous state. The erroneous state(s) may include a dry pump activation erroneous state in which the pump is activated with both the product outlet valve in the closed position and the rinse tank outlet valve in the closed position. The erroneous state(s) may also include a mixed product/rinse erroneous state in which both the product outlet valve and the rinse tank outlet valve are in the open position. The control system may display an error message in response to a request to activate the pump when both the product outlet valve and the rinse tank outlet valve are in the closed position. The control system may perform a correction command when a request is made to simultaneously deliver both the liquid product and the rinse liquid. This can be done by way of the rules engine which may be configured to close a currently open one of the product outlet valve and the rinse tank outlet valve upon opening a currently closed one of the product outlet valve and the rinse tank outlet valve so that only one of the liquid product and the rinse liquid can be directed to the pump at a given time.

According to another aspect of the invention, the air purge system includes an air tank storing compressed air. The on-board valve system may further include an air tank outlet valve configured to actuate between a closed position preventing flow of the compressed air toward the spray boom and an open position permitting flow of the compressed air out of the air tank to the spray boom for pneumatically purging spray nozzles of the spray boom. The control system may further include an air tank close/open button displayed on the touchscreen controlling the an tank outlet valve. Pressing the air tank close/open button actuates the air tank outlet valve between the closed and open positions.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing horn the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
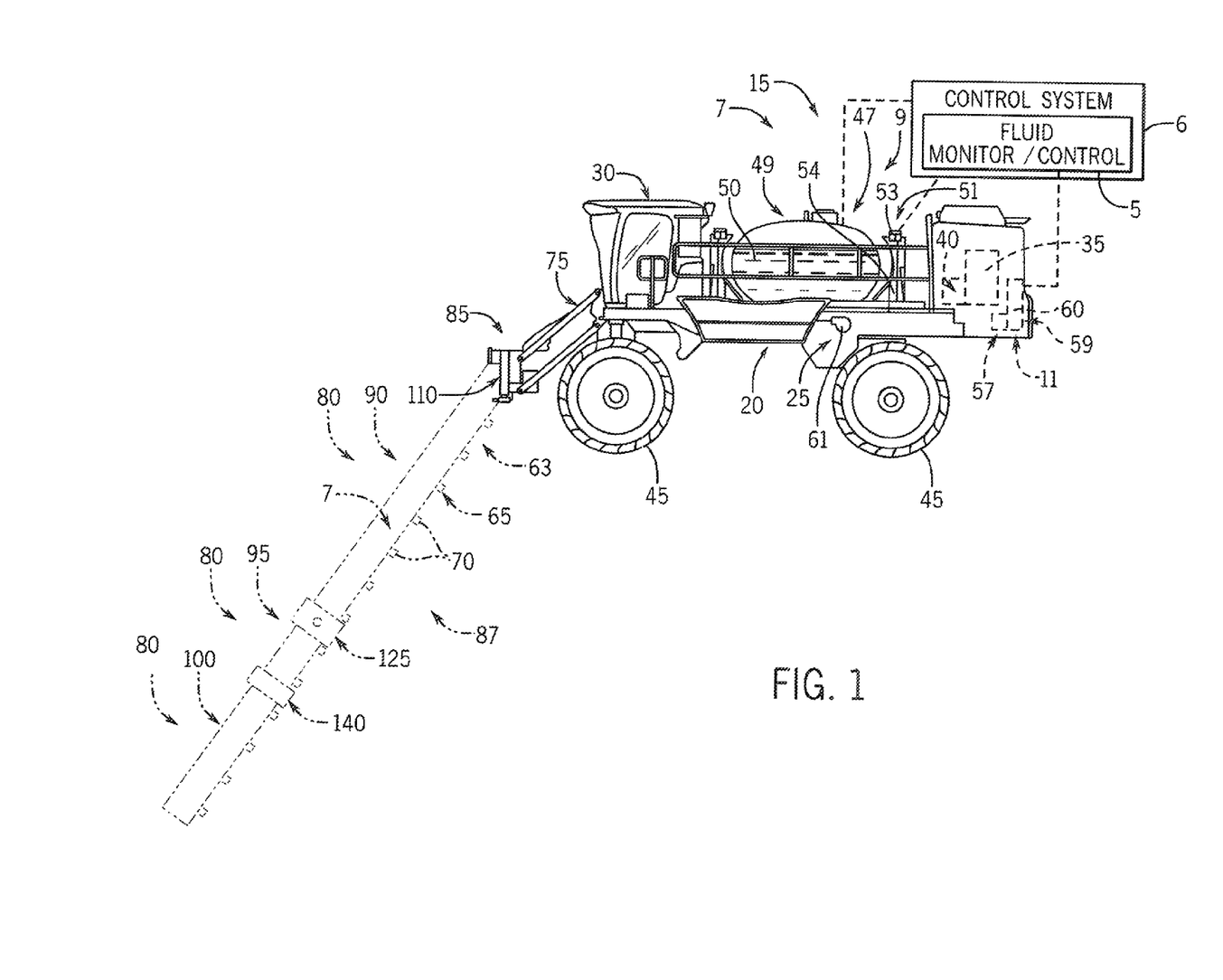
FIG. 1 is a side elevation of a self-propelled sprayer with a fluid flow monitoring and control system according to the present invention.

Referring now to the drawings and specifically to FIG. 1, a fluid flow monitoring and control system shown as flow monitoring and control system 5 of an overall control system 6 is provided for controlling a product system 7, a rinse system 9, and an purge system 11, explained in greater detail elsewhere herein, and is shown for use with an agricultural applicator. The agricultural applicator is a machine that deposits, for example, liquid as well as dry and gaseous product, above and below ground, pre-emerge and post-emergence or sprouting of the crop, which includes operations such as seeding, inter-seeding, fertilizing and application of, for example, herbicides, fungicides, and insecticides as well as soil conditioners, growth retardants and other agents, such as by way of various toolbar attachments, planters, anhydrous ammonia applicators, and others. The agricultural applicator may be a sprayer and is shown here as a self-propelled agricultural sprayer vehicle or self-propelled sprayer 15 having a spray boom 17. Although sprayer 15 is shown as a front-mounted boom self-propelled sprayer, it is understood that self-propelled versions of sprayer 15 can have either front-mounted, mid-mount, or rear-mounted booms, such as those available from CNH Industrial, including the Miller Nitro and Condor Series sprayers and New Holland Guardian Series sprayers, as well as pull-type or towed sprayers, boom-less sprayers, tired booms, and detachable sprayers.

Still referring to FIG. 1, sprayer 15 includes chassis 20 having chassis frame 25 that supports various assemblies, systems, and components. These various assemblies, systems, and components include cab 30, engine 35, and hydraulic system 40. Hydraulic system 40 receives power from engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from engine 35 and delivers power for rotating wheels 45 by way of power-transmitting driveline components such as drive shafts, differentials, and other gear sets in portal, drop boxes, or other housings.

Figure 2:
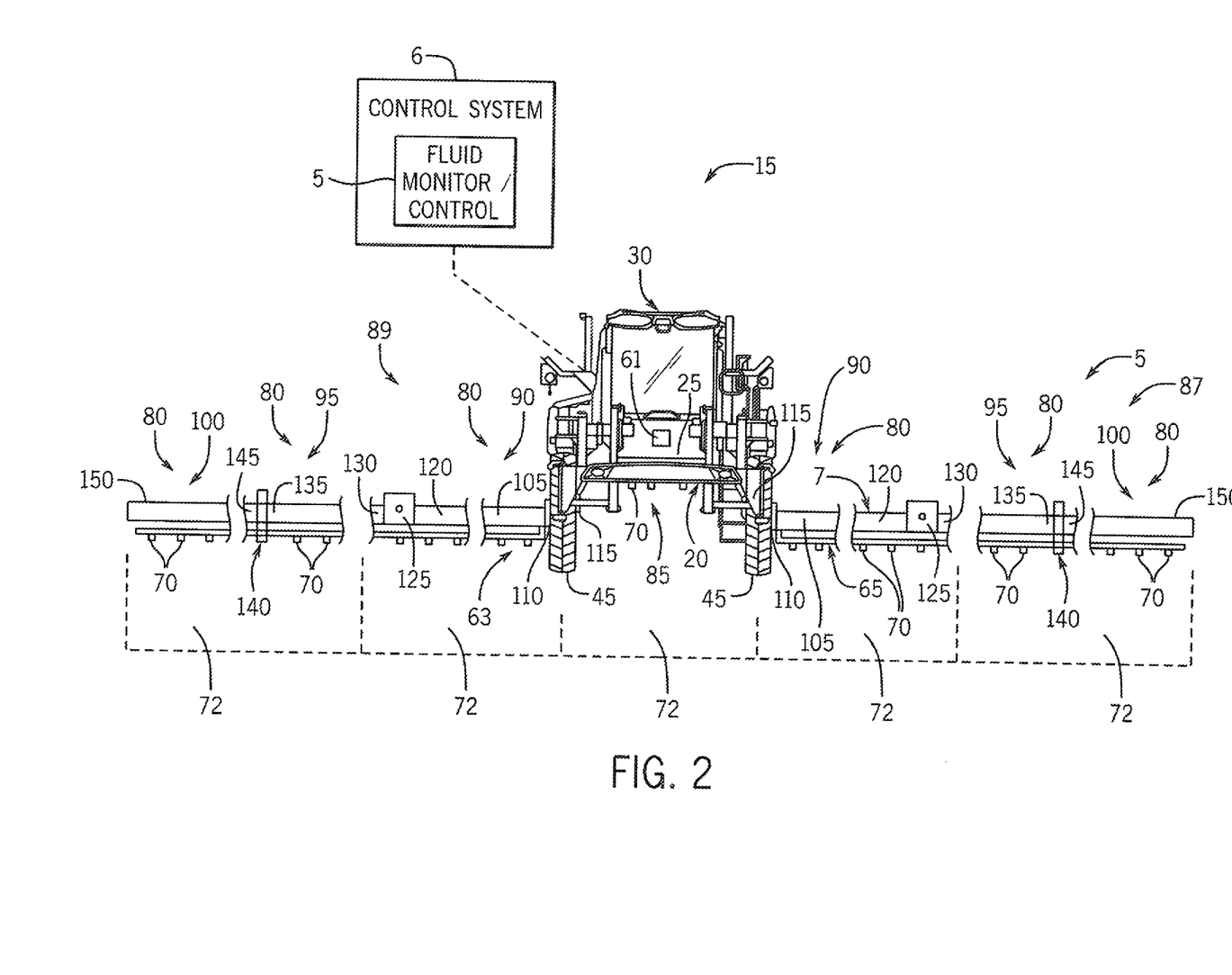
FIG. 2 is a front elevation of the self-propelled sprayer of FIG. 1.

Still referring to FIG. 1, product system 7 includes a product storage system 47 with product tank 49 storing an agricultural liquid product 50 on the sprayer 15 on a chassis of the sprayer 15. Product 50 includes any of a variety of agricultural liquid products, such as various pesticides, herbicides, fungicides, liquid fertilizers, and other liquids including liquid suspensions beneficial for application onto agricultural fields by way of boom 17. Rinse system 9 includes a rinse liquid storage system 51 having rinse tank 53 storing a rinse liquid 54 such as water or another suitable rinse liquid. Air purge system 11 includes a compressed air storage system 55 having an air compressor 57 operably connected to air tank 59 that stores air 60 compressed by compressor 57. Flow monitoring and control system 5 is configured to selectively direct liquid product 50, rinse liquid 54, or air 60 through various flow paths defined through the sprayer 15 and boom 17 depending on whether a spraying procedure, a rinsing procedure, or a pneumatic purging or boom blow-out procedure is being performed. During spraying and rinsing procedures, flow monitoring and control system 5 energizes a pump 61 to convey either liquid product 50 or rinse liquid 54 to boom 17. Referring now to FIG. 2, pump 61 pushes either liquid product 50 or rinse liquid 54 through plumbing components such as interconnected pieces of tubing and through a boom flow system 63 that includes segments of boom tubing 65 for release out of spray nozzles 70 that are spaced from each another along the width of boom 17 during spraying or rinsing operations of sprayer 15. Groups or banks of multiple adjacent application or spray nozzles 70 define multiple application or spray sections 72 of an application or spray system of sprayer 15. During spraying procedures, spray sections 72 defined along boom 17 selectively deliver product 50 for release onto an agricultural field at locations corresponding to positions of activated spray sections 72. Boom 17 is connected to chassis 20 with lift arm assembly 75 that is configured to move the boom 17 up and down for adjusting the height of application of the product 50.

Still referring to FIG. 2, boom 17 includes multiple boom segments 80 connected longitudinally to provide the corresponding width of the assembled boom 17. Boom segments 80 include center section 85 and left and right boom arms 87, 89 extending in opposite directions from center section 85. Left and right boom arms 87, 89 have multiple segments with pairs of primary boom segments 90, secondary boom segments 95, and breakaway boom segments 100 extending in opposite directions along the respective left and right boom arms 87, 89 mirrored about a longitudinal axis of the sprayer 15. The corresponding left and right segments of the pairs of primary, secondary, and breakaway boom segments 90, 95, 100 are substantially identical, so only one will be described, with the description applying to both the left and right segments of left and right boom arms 87, 89. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 17 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored position of boom 17, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15.

Figure 3:
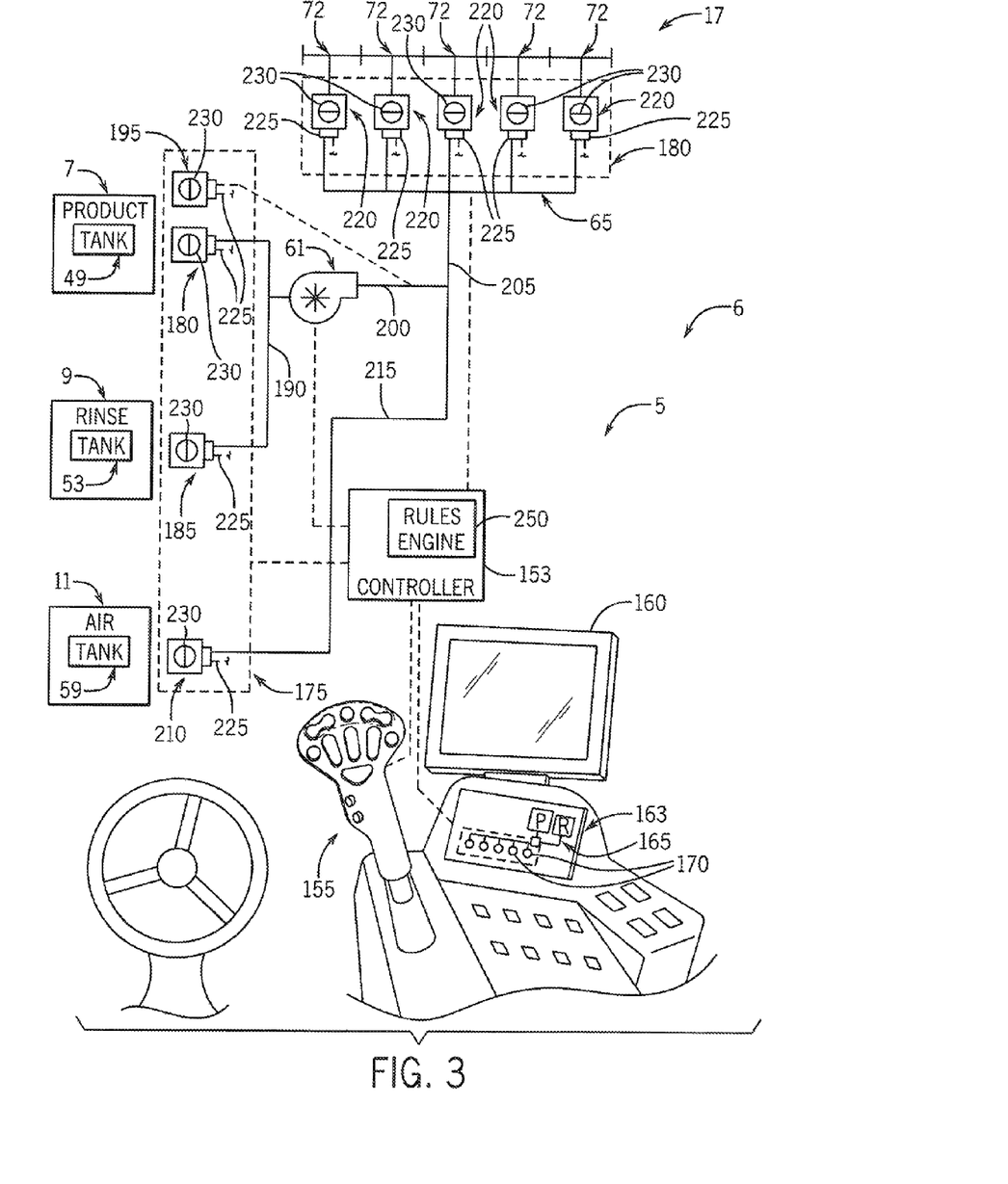
FIG. 3 is a simplified partially schematic pictorial view of the fluid flow monitoring and control system.

Referring now to FIG. 3, in addition to flow monitoring and control system 5, control system 6 includes various control subsystems configured to control other operations of sprayer 15, such as controlling steering, speed, braking, shifting, and other operations of the sprayer 15, including controlling movements of boom 17 such as height adjustments and folding and unfolding procedures.

Still referring to FIG. 3, control system 6 has at least one master controller or machine controller, shown as controller(s) 153. Controller(s) 153 includes a microprocessor and may be implemented as a programmable logic controller (PLC) other industrial computer, along with corresponding software and suitable memory for storing such software and hardware including interconnecting conductors for power and signal transmission and communication for control ling electronic, electro-mechanical, pneumatic, and hydraulic components of the sprayer 15. Communication may be done through one or more serial bus systems such as a CAN (controller area network) bus(es) between controller 153 and various intelligent devices as well as sensors, actuators, and/or other components of sprayer 15 for monitoring and controlling the corresponding systems and components of the sprayer 15, which may be established as nodes on the bus. The CAN bus(es) may implement an ISO or other suitable specification or protocol. In this way, control system 6 is configured for controlling steering, speed, braking, shifting, and other operations of the sprayer 15, including movement of boom 17 in addition to the fluid flow monitoring and control through the flow monitoring and control system 5.

Still referring to FIG. 3, control system 6 has multiple operator control interfaces that allow for operator control of the systems and components of sprayer 15. The operator control interfaces may include a joystick 155, a VT (virtual terminal) or field computer 160, and monitor 163 with a touchscreen 165 as an HMI (human machine interface). Although shown as a single HMI, it is understood that multiple HMI's may be implemented such as an in-cab HMI and another at a load station, or a portable HMI via an electronic tablet application program or dedicated HHD (hand held device) either wireless or tethered to control system 6. It is further understood that the HMI may be implemented as a switch and light panel with buttons corresponding to functions controlled by the control system 6, with indicator lights showing respective statuses. Joystick 155 is movable forward and back for controlling speed and direction of sprayer 15 and has a grip with buttons for controlling various functions of sprayer 15 including movement characteristics such as range and speed controls. Boom and spray control buttons on joystick 155 are configured to control boom position spray section deactivation/activation such as sequentially turning sections off from either end, from the outside toward the other end and turning sections on in respective opposite directions. Field computer 160 may be configured for controlling precision agriculture-type procedures, as well as various components and systems of the sprayer 15. Sprayer monitor 163 with touchscreen 165 is shown integrated into a dashboard or control panel of the cab 30. Touchscreen 165 displays status information such as real-time status(es) of product system 7, rinse system 9, and air purge system 11 and corresponding components. Touchscreen 165 communicates with at least one controller(s) 167 and has various buttons displayed as generally shown as graphical buttons 170 for controlling product system 7, rinse system 9, and air purge system 11 and corresponding components through the controller(s) 167 sending control signals and may receive feedback signals as bidirectional communication through an ISO bus and/or CAN bus. Controller (s) 167 can include a programmable logic controller (PLC) or other industrial computer to communicate through the ISO bus and/or CAN bus to control various systems and components of the sprayer 15, along with corresponding software and suitable memory for storing such software and hardware including interconnecting conductors for power and signal transmission for controlling electronic, electromechanical, and hydraulic components of the sprayer 15. In this way, flow monitoring and control system 5 is configured for controlling steering, speed, braking, shifting, and other operations of the sprayer 15 in addition to the height and folding operations of boom 17 and controlling product system 7, rinse system 9, and air purge system 11 and corresponding components.

Still referring to FIG. 3, through the controller 153, touchscreen 165 is operably connected to on-board valve system 175 that communicates with product system 7, rinse system 9, and air purge system 11 and is controllable for changing characteristics such as flow path and the particular type of fluid being implemented on the sprayer 15. Through controller 153, touchscreen 165 is also operably connected to boom valve system 180 controllable for changing characteristics of boom flow system 63, such as changing a flow path through the boom flow system 63, which may include deactivating and activating spray sections 72 to prevent or allow spraying product 50 through the spray section 72, respectively. On-board valve system 175 includes various valves such as electronically actuated ball valves which include product tank outlet valve 180 configured to actuate between closed and open positions respectively preventing and permitting flow of liquid product 50 out of an outlet of product tank 49 toward pump 61. Rinse tank outlet valve 185 of on-board valve system 175 is configured to actuate between closed and open positions respectively preventing and permitting flow of rinse liquid 54 out of an outlet of rinse tank 53 toward pump 61. The product and rinse tank outlet valves 180, 185 feed a common pump feed line 190 connected to an inlet of pump 61. A recirculation valve 195 may be arranged downstream of pump 61, connected to pump outlet tube 200 that, when open, allows liquid pumped by pump 61 to flow through a recirculation circuit defined through tubing connecting back to product tank 49 instead of flowing through a boom feed line 205 connected to the boom tubing 65. Air tank outlet valve 210 of on-board valve system 175 is configured to actuate between closed and open positions, respectively, preventing and permitting flow of compressed air 60 out of an outlet of air tank 59. The air tank outlet valve 210 feeds an air line 215 that connects to boom feed line 205 for pneumatically purging or blowing out the boom tubing 65 and spray nozzles 70 (FIG. 2).

Still referring to FIG. 3, boom valve system 180 includes various valves such as electronically actuated ball valves including spray section feed valves 220, each receiving a fluid from the boom tubing 65 and selectively delivering the fluid to a respective one of the spray sections 72 of boom 17 and the spray nozzles 70 (FIG. 2) of the particular spray section 72. Each of the product, rinse, and air tank outlet valves 180, 185, 210 and the spray section feed valves 220 includes an actuator 225 that can be energized to move a valve body 230 between the open and closed positions. Actuation of the product, rinse, and air tank outlet valves 180, 185, 210 and energizing/de-energizing fan 61 by operator instructions inputted through the touchscreen 165 may be evaluated and modified by a rules engine 250. Rules engine 250 may be implemented through the controller 153 for performing evaluations and making various decisions, as explained in greater detail elsewhere herein.

Figure 4:
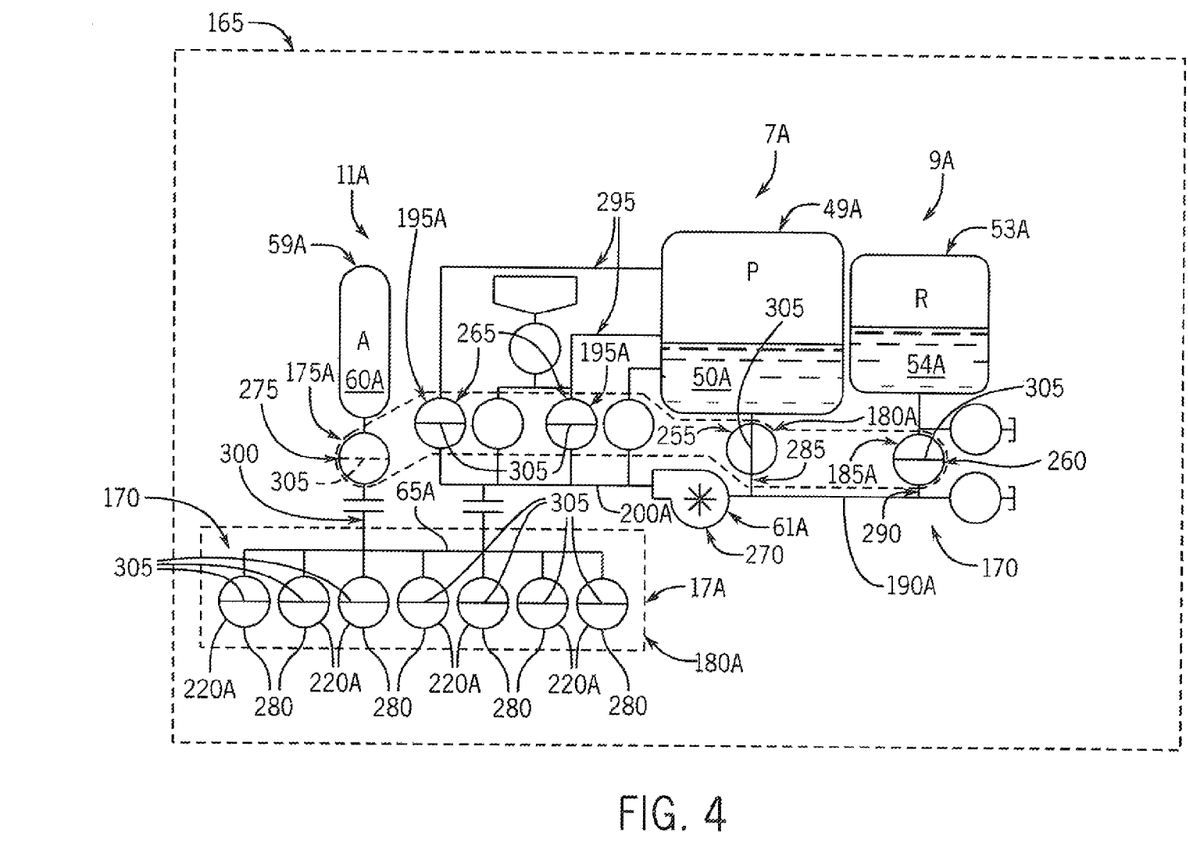
FIG. 4 is a simplified screenshot of a touchscreen of the fluid flow monitoring and control system of FIG. 3.

Referring now to FIG. 4, one of the operative screens of touchscreen 165 is shown providing a visual display of product system 7, rinse system 9, air purge system 11, and boom 17 and corresponding statuses by way of icon graphical representations. The graphical representations in FIG. 4 have the same labels as the component(s) and system(s) counterparts shown in FIG. 3, the statuses of which are represented, only having a label "A" following each numerical label. At least some of such graphical representations define buttons 170 that can be pressed for controlling corresponding components. Buttons 170 include product tank close/open button 255 that, when pressed, controls closing and opening the product tank outlet valve 180 (FIG. 3). Rinse tank close/open button 260, when pressed, controls closing and opening the rinse tank outlet valve 185 (FIG. 3). Recirculation activate/deactivate button(s) 265, when pressed, controls closing and opening the recirculation valve(s) 195 (FIG. 3). Pump activate/deactivate button 270, when pressed, energizes and de-energizes pump 61 (FIG. 3) to convey either liquid product 50 or rinse liquid 54 toward boom 17 (FIG. 3) or through the recirculation circuit back toward product tank 49. Air tank close/open button 275, when pressed, controls closing and opening the air tank outlet valve 210 (FIG. 3), releasing compressed air downstream through air line 215. Spray section activate/deactivate button(s) 280, when pressed, controls closing and opening the spray section feed valves 220 (FIG. 3).

Still referring to FIG. 4, buttons 170 and other graphic representations of components on the touchscreen 165 are configured to change visually to provide a visual indication of status. Status can include an active and/or inactive flow path(s) defined by a product circuit 285, rinse circuit 290, recirculation circuit 295, or airflow circuit 300 from the respective product, rinse, and air purge systems 7, 9, and 11 (FIG. 3), which are graphically represented as product, rinse, and an purge system icons 7A, 9A, and 11A. Product circuit 285 is defined along a flow path that flows from product tank 49A, through product tank outlet valve 180A, pump feed line 190A, pump 61A, pump outlet tube 200A, and into and through boom 17A. Rinse circuit 290 is defined along a flow path that flows from rinse tank 53A, through rinse tank outlet valve 185A, pump feed line 190A, pump 61A, pump outlet tube 200A, and into and through boom 17A. Recirculation circuit(s) 295 is defined along a flow path that flows from product or rinse tank 49A, 53A, through product or rinse tank outlet valve 180A, 185A, pump feed line 190A, pump 61A, pump outlet tube 200A, recirculation valve(s) 195 and into product tank 49A. Airflow circuit 300 is defined along a flow path that flows from air tank 59A, through air tank outlet valve 175A, and into and through boom 17A. The visual indication of status can include displaying a currently active one of the product, rinse, recirculation, and air circuits 285, 290, 295, 300 and their included components in the corresponding flow path in a common color that is visually conspicuous, such as being bright and bolder than the others with the inactive product, rinse, recirculation, and air circuits 285, 290, 295, 300 being grayed-out or white/uncolored.

Still referring to FIG. 4, the valve buttons such as product tank close/open button 255, rinse tank close/open button 260, recirculation activate/deactivate button(s) 265, air tank close/open button 275, and spray section activate/deactivate button(s) 280 are configured to visually change to represent status such as current status by changing orientation of a reference bar 305. Reference bar 305 is a graphical representation of valve bodies 230 (FIG. 3) of the corresponding product tank outlet valve 180, rinse tank outlet valve 185, recirculation valve(s) 195, air tank outlet valve 210, and spray section feed valves 220. Bars 305 are arranged horizontally or perpendicularly relative flow direction through longitudinal axes respective tubing segment(s) when representing a closed status of the corresponding valve and vertical or aligned with the flow direction through longitudinal axes of the respective tubing segment(s) when representing an open status of the corresponding valve.

Referring now to FIGS. 3 and 4, open and/or closed status of each of the product tank outlet valve 180, rinse tank outlet valve 185, recirculation valve(s) 195, air tank outlet valve 210, and spray section feed valves 220 can be determined for representation of orientation of bars 305 (FIG. 4) on touchscreen 165 by way of bidirectional communications with controller 153 (FIG. 3). Controller 153 command signals to the valves 180, 185, 195, 210, 220 to energize the respective actuator 225 to move the corresponding valve body 230 to the open position on the closed position, depending on desired system performance or procedures of sprayer 15 (FIG. 1) at a given time which may be inputted through the touchscreen 165 and/or otherwise commanded by controller 153. Each of valves 180, 185, 195, 210, 220 sends a response to feedback signal to controller 153, corresponding to its open or closed position as a current valve status. Based on this current valve status, controller 153 commands the corresponding bars 305 to display in the respective closed or open orientation, along with visually indicating the corresponding flow path for active circuit the results from the statuses of the valves.

Figure 5:
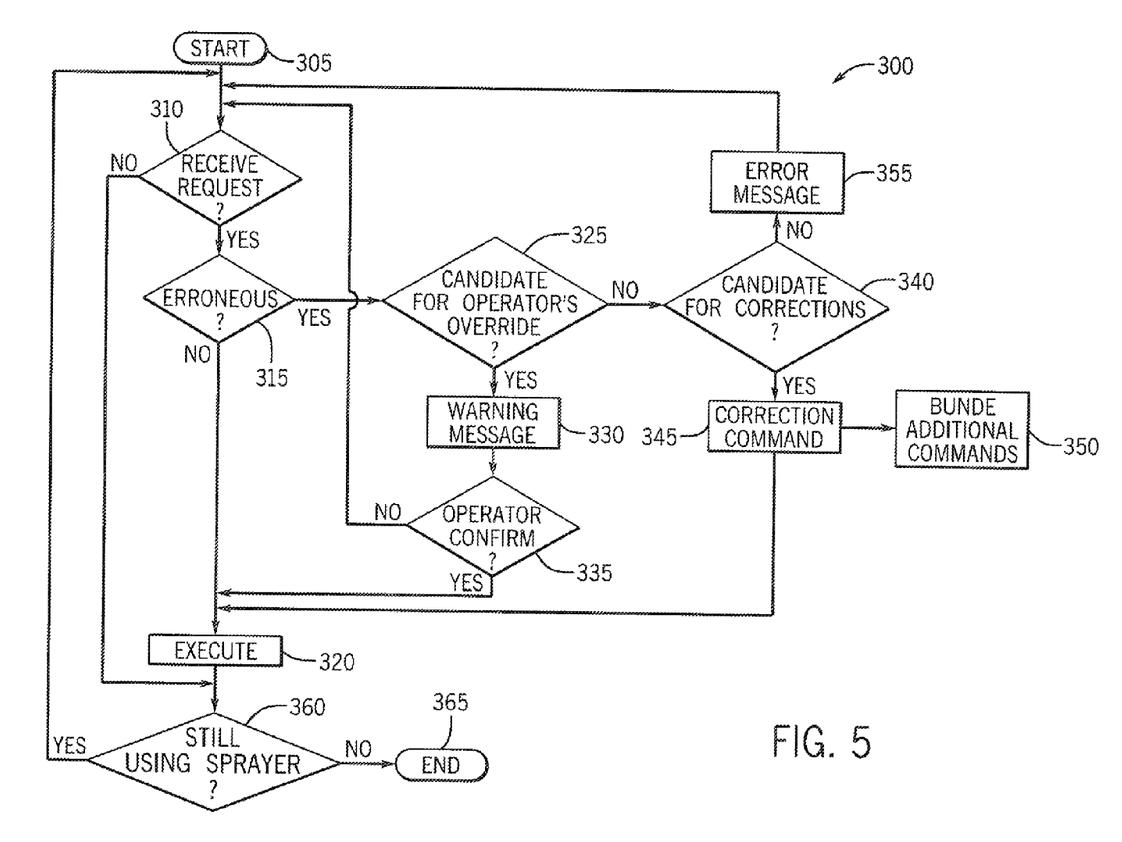
FIG. 5 is a flow diagram of a process used by a rules engine of the fluid flow monitoring and control system.

Referring now to FIGS. 3-5, rules engine 250 (FIG. 3) is configured to evaluate operator requests inputted through buttons 170 of touchscreen 165 (FIG. 4), allow and implement the request, implement the request along with a correction command, and/or deny the request, at least some of which may be accompanied by a message displayed on the touchscreen 165 which may include asking operator confirmation, providing an error or warning message.

Referring now to FIG. 5 and with further references to FIGS. 3 and 4, process 300 schematically represents a process that rules engine 250 (FIG. 3) may implement when evaluating operator requests to prevent erroneous states of operation within the systems of sprayer 15. As represented at block 305, process 300 starts when use of sprayer 15 begins. As represented at blocks 310 and 315, when an operator makes a request to the touchscreen 165 for controlling and changing the state of a component(s) of product system 7, rinse system 9, an purge system 11, and boom 17, the rules engine torque 50 evaluates the request to determine whether the request is erroneous. This may be done by referring to a lookup table or other stored values, at controller 153 or elsewhere, which correspond to potentially erroneous states. Examples of requests include pressing various ones of the valve buttons such as product tank close/open button 255, rinse tank close/open button 260, recirculation activate/deactivate button(s) 265, pump activate/deactivate button 270, air tank close/open button 275, and spray section activate/deactivate button(s) 280 for activating or deactivating product, rinse, and air circuits 285, 290, 295, 300, pump 61, or various ones of the spray sections 72. As represented at block 315, the rules engine 250 determines that the request is not erroneous, and controller 153 executes the request as represented at block 320, such as by sending a command to actuate the corresponding valve(s) or turn the pump 61 on or off. If at block 315, the rules engine 250 determines that the request is erroneous, the rules engine 250 determines whether the release request is a candidate to be overridden and thus allowed by the operator as represented at block 325. An erroneous request that is a candidate to be overridden includes requests that in some situations, could be acceptable. This may include a request to activate the recirculation circuit 295 (FIG. 3) by pressing one of the recirculation buttons 265 when the rinse circuit 290 is activated. This request would result in rinse liquid 54 being pumped through the recirculation circuit 295 into the product tank 49. This action may be acceptable if the product tank 49 is empty and the purpose of the request is to perform onboard rinsing of the product tank 49. As represented at block 330, controller 153 displays a warning message on the touchscreen 165 indicating that rinse liquid 54 would be pumped into the product tank 49. As represented at block 335, controller 153 displays a request for confirmation from the operator that this is the procedure the operator wants to perform. If the operator does not confirm, then the request is not executed and rules engine 250 awaits the next request at block 310. If the operator confirms that the request corresponds to the intended procedure, then the controller 153 executes the request at block 320. Referring again to block 325, the erroneous request may not be a candidate for the operator's override. This may happen when the request leads to a high risk of compromising the integrity of a component of one of the systems or other system performance characteristics. During such a situation, the rules engine 250 determines whether the request is a candidate for correction as represented at block 340. If so as represented at block 345, the rules engine 250 provides a corresponding correction command that converts the erroneous request to an acceptable request. As represented at block 350, this may include bundling additional commands with the command that corresponds to the erroneous request. One such bundled additional command(s) is a correction command to deactivate an already activated one of the product and rinse circuits 285, 290 when the operator requests turning on the other one product and rinse circuits 285, 290. Stopping delivery of the liquid product 50 or rinse liquid 54 before starting delivery of the other ensures that only one of the liquid product 50 and rinse liquid 54 is delivered to pump 61 at any given time, avoiding simultaneous feeding the different liquids. The correction command and/or bundled additional commands as a resolved erroneous command is then executed at block 320. Referring again to block 340, if the erroneous request is not a candidate for correction, the new correction command is generated. This may happen in situations that could lead to rapid part failure such as cavitation of a suction side of pump 61 when neither liquid product 50 nor rinse liquid 54 is being fed to the inlet of pump 61. Energizing pump 61 with both the product tank valve 180 (FIG. 3) and the rinse tank outlet valve 185 turned off could lead to cavitation on the suction side of pump 61. In such a situation, as represented at block 350, controller 153 displays an error message on the touchscreen 165 and does not perform the requested action. The error message may include a description of component statuses relating to the erroneous request along with a recommendation for resolving the erroneous request, such as recommending opening one of the product and rinse tank outlet valves 180, 185 before activating pump 61. This process is repeated as long as the sprayer 15 is being used as represented at blocks 360 and 365.

Thus, by way of touchscreen 165, full view and control of the various fluid systems of sprayer 15, including valve activation and deactivation patterns in the sprayer 15, may be achieved without using field computer 160. Furthermore, control system 6 allows for controlling multiple product circuits, multiple application, spray, or injection systems into or through one or more circuits.

Many changes and modifications could be made to the invention without departing from the spirit thereof. The scope of these changes will become apparent from the appended claims.

We claim:

1. A fluid flow monitoring and control system for a self-propelled agricultural sprayer, the system comprising:
   a product storage system having a product tank storing an agricultural liquid product on a chassis of the sprayer;
   a spray boom supported by the chassis of the sprayer and defining multiple spray sections receiving the liquid product and selectively delivering the liquid product to an agricultural field;
   an on-board valve system including a product tank outlet valve configured to actuate between a closed position preventing flow of the liquid product out of the product tank and an open position permitting flow of the liquid product out of the product tank;
   a boom valve system including multiple spray section feed valves, wherein each of the spray section feed valves is configured to actuate between a closed position preventing flow of the liquid product for delivery through a respective spray section and an open position permitting flow of the liquid product through the respective spray section;
   a control system for controlling the on-board and boom valve systems, the control system including an operator interface with a monitor displaying a current state of each of the product tank outlet valve and the spray section feed valves with the current state corresponding to whether the product tank outlet valve and the spray section feed valves are in the closed or open positions at a current time, and
   wherein the monitor includes a touchscreen with a first set of buttons controlling the boom valve system and a second set of buttons controlling the on-board valve system.

2. The fluid flow control system of claim 1 wherein the first set of buttons controlling the boom valve system includes multiple spray deactivation/activation buttons displayed on the touchscreen with the multiple spray deactivation/activation buttons controlling the multiple spray section feed valves, wherein pressing each of the spray deactivation/activation buttons actuates the respective spray section feed valve between the closed and open positions; and
   the second set of buttons controlling the on-board valve system includes a product tank close/open button displayed on the touchscreen controlling the product tank outlet valve, wherein pressing the product tank close/open button actuates the product tank outlet valve between the closed and open positions.

3. The fluid flow control system of claim 2 wherein the multiple spray deactivation/activation buttons change visually when pressed to provide a visual indication of a changed state corresponding to changing between the closed and open positions of the spray section feed valves.

4. The fluid flow control system of claim 2 wherein the product tank close/open button changes visually when pressed to provide a visual indication of a changed state corresponding to changing between the closed and open positions of the product tank outlet valve.

5. The fluid flow control system of claim 2 wherein bidirectional communication is defined between the control system and each of the spray section feed valves and the product tank outlet valve with each of the spray section feed valves and the product tank outlet valve sending a response signal to the control system corresponding to current states of the spray section feed valves and the product tank outlet valve.

6. The fluid flow control system of claim 2 further comprising a pump arranged between the product tank and the spray boom for delivering liquid product from the product tank to the spray boom and the control system includes a pump deactivation/activation button displayed on the touchscreen controlling the pump, wherein pressing the pump deactivation/activation button deactivates and activates the pump.

7. The fluid flow control system of claim 6 further comprising a rinse liquid storage system comprising a rinse tank storing a rinse liquid and wherein,
   the on-board valve system further comprises a rinse tank outlet valve configured to actuate between a closed position preventing flow of the rinse liquid out of the rinse tank and an open position permitting flow of the rinse liquid out of the rinse tank to the pump for delivery toward the spray boom; and
   the control system further comprises a rinse tank close/open button displayed on the touchscreen controlling the rinse tank outlet valve, wherein pressing the rinse tank close/open button actuates the rinse tank outlet valve between the closed and open positions.

8. The fluid flow system of claim 7 wherein the control system further comprises a rules engine configured to prevent at least one erroneous state, wherein the at least one erroneous state includes a dry pump activation erroneous state in which the pump is activated with both the product outlet valve in the closed position and the rinse tank outlet valve in the closed position.

9. The fluid flow system of claim 8 wherein the control system displays an error message in response to a request to activate the pump when both the product outlet valve and the rinse tank outlet valve are in the closed position.

10. The fluid flow system of claim 8 wherein the rules engine prevents a mixed product/rinse erroneous state in which both the product outlet valve and the rinse tank outlet valve are in the open position.

11. The fluid flow system of claim 10 wherein the rules engine is configured to close a currently open one of the product outlet valve and the rinse tank outlet valve upon opening a currently closed one of the product outlet valve and the rinse tank outlet valve so that only one of the liquid product and the rinse liquid can be directed to the pump at a given time.

12. The fluid flow system of claim 2 further comprising an air purge system comprising an air tank storing compressed air and wherein,
   the on-board valve system further comprises an air tank outlet valve configured to actuate between a closed position preventing flow of the compressed air toward the spray boom and an open position permitting flow of the compressed air out of the air tank to the spray boom for pneumatically purging spray nozzles of the spray boom; and
   the control system further comprises an air tank close/open button displayed on the touchscreen controlling the air tank outlet valve, wherein pressing the air tank close/open button actuates the air tank outlet valve between the closed and open positions.

13. A self-propelled agricultural sprayer, comprising:
   a chassis;
   a product storage system having a product tank storing an agricultural liquid product on the chassis;
   a rinse liquid storage system comprising a rinse tank storing a rinse liquid on the chassis;

a spray boom supported by the chassis and including multiple spray nozzles selectively delivering the liquid product to an agricultural field;

an on-board valve system including, a product tank outlet valve configured to actuate between a closed position preventing flow of the liquid product out of the product tank and an open position permitting flow of the liquid product out of the product tank;

a rinse tank outlet valve configured to actuate between a closed position preventing flow of the rinse liquid out of the rinse tank and an open position permitting flow of the rinse liquid out of the rinse tank to the pump for delivery toward the spray boom; and a pump arranged between the spray boom and each of the product tank and the rinse tank to convey the liquid product and the rinse liquid toward the spray boom;

a control system configured to control the product tank outlet valve and the rinse tank outlet valve and including a rules engine configured to prevent at least one erroneous state corresponding to multiple user requests that potentially conflict with each other, at least one erroneous state including at least one of, a dry pump activation erroneous state in which the pump is activated with both the product outlet valve in the closed position and the rinse tank outlet valve in the closed position; and a mixed product/rinse erroneous state in which both the product outlet valve and the rinse tank outlet valve are simultaneously in the open position.

14. The self-propelled agricultural sprayer of claim 13 wherein the control system includes a monitor displaying a current state of each of the product tank outlet valve and the rinse tank outlet valve corresponding to whether the product tank outlet valve and rinse tank outlet valve are in the closed or open positions at a current time.

15. The self-propelled agricultural sprayer of claim 14 wherein bidirectional communication is defined between the control system and each of the product tank outlet valve and rinse tank outlet valve for sending a response signal to the control system corresponding to current states of the product tank outlet valve and rinse tank outlet valve.

16. The self-propelled agricultural sprayer of claim 15 wherein the monitor includes a touchscreen and the control system further comprises, a product tank close/open button changes visually when pressed to provide a visual indication of a changed state corresponding to changing between the closed and open positions of the product tank outlet valve; and a rinse tank close/open button displayed on the touchscreen controlling the rinse tank outlet valve, wherein pressing the rinse tank close/open button actuates the rinse tank outlet valve between the closed and open positions.

17. A method of controlling fluid flow through a self-propelled agricultural sprayer, the method comprising:

displaying on a touchscreen an on-onboard flow path corresponding to a flow path through which a liquid product or a rinse liquid flows through an on-board flow system that includes an on-board valve system;

changing a characteristic of the on-board flow system by receiving a first user request through the touchscreen to control the on-board valve system;

changing the display of the on-onboard flow path to reflect the changed characteristic of the on-board flow system;

displaying on the touchscreen a boom flow path corresponding to a flow path through which the liquid product or rinse liquid flows through a boom flow system that includes a boom valve system;

changing a characteristic of the boom flow system by receiving a second user request through the touchscreen to control the boom valve system; and changing the display of the boom flow path to reflect the changed characteristic of the boom flow system corresponding to activation or deactivation of valve in the on-board and boom valves systems in response to the first and second user requests.

18. The method of claim 17 further comprising:

displaying a product tank close/open button on the touchscreen for controlling a product tank outlet valve as a first characteristic of the on-board flow system, wherein pressing the product tank close/open button actuates the product tank outlet valve between closed and open positions;

changing a visual appearance of the product tank close/open button corresponding to changing between the closed and open positions of the product tank outlet valve;

displaying a rinse tank close/open button on the touchscreen for controlling a rinse tank outlet valve as a second characteristic of the on-board flow system, wherein pressing the rinse tank close/open button actuates the rinse tank outlet valve between closed and open positions; and changing a visual appearance of the rinse tank close/open button corresponding to changing between the closed and open positions of the rinse tank outlet valve.

19. The method of claim 17 further comprising:

displaying multiple spray section deactivation/activation buttons on the touchscreen for controlling multiple spray section feed valves as a characteristic of the boom flow system, wherein each of the spray section feed valves is configured to actuate between a closed position preventing flow of the liquid product for delivery through a respective spray section and an open position permitting flow of the liquid product through the respective spray section; and changing a visual appearance of the spray section deactivation/activation buttons corresponding to changing between the closed and open positions of the spray section feed valves.

20. The method of claim 19 further comprising receiving a user request to open one of the product tank outlet valve and the rinse tank outlet valve and in response to the request, opening the one of the product tank outlet valve and the rinse tank outlet valve; and closing the other one of the product tank outlet valve and the rinse tank outlet valve.

* * * * *